United States Patent [19]

Nakamura

[11] Patent Number: 4,609,256

[45] Date of Patent: Sep. 2, 1986

[54] LIQUID CRYSTAL OPTICAL DEVICE

[75] Inventor: Haruo Nakamura, Suwa, Japan

[73] Assignee: Seiko Epson Corporation, Tokyo, Japan

[21] Appl. No.: 401,272

[22] Filed: Jul. 23, 1982

[30] Foreign Application Priority Data

Jul. 24, 1981 [JP] Japan ................ 56-116005

[51] Int. Cl.⁴ .................. G02F 1/13; C09K 19/30; C09K 19/20
[52] U.S. Cl. ............... 350/346; 252/299.63; 252/299.64; 252/299.67
[58] Field of Search ............. 350/346; 252/299.01, 252/299.63, 299.64, 299.67

[56] References Cited

U.S. PATENT DOCUMENTS

| | | | |
|---|---|---|---|
| 3,953,491 | 4/1976 | Steinstrasser et al. | 252/299.64 X |
| 3,975,286 | 8/1976 | Oh | 252/299.66 X |
| 4,009,934 | 3/1977 | Goodwin et al. | 252/299.62 X |
| 4,082,428 | 4/1978 | Hsu | 252/299.01 X |
| 4,130,502 | 12/1978 | Eidenschink et al. | 252/299.63 |
| 4,195,916 | 4/1980 | Coates et al. | 252/299.01 X |
| 4,198,312 | 4/1980 | Sato et al. | 252/299.63 |
| 4,229,315 | 10/1980 | Krause et al. | 252/299.63 |
| 4,237,026 | 12/1980 | Eidenschink et al. | 252/299.63 |
| 4,261,651 | 4/1981 | Gray et al. | 252/299.63 |
| 4,279,770 | 7/1981 | Inukai et al. | 252/299.63 |
| 4,368,135 | 1/1983 | Osman | 252/299.63 |
| 4,400,293 | 8/1983 | Romer et al. | 252/299.63 |
| 4,405,209 | 9/1983 | Funada | 252/299.4 X |
| 4,405,488 | 9/1983 | Sugimori et al. | 252/299.66 X |

FOREIGN PATENT DOCUMENTS

| | | | |
|---|---|---|---|
| 84194 | 7/1983 | European Pat. Off. | 252/299.63 |
| 2939782 | 4/1981 | Fed. Rep. of Germany | 252/299.61 |
| 54-152684 | 12/1979 | Japan | 252/299.63 |
| 55-66556 | 5/1980 | Japan | 252/299.63 |
| 55-84385 | 6/1980 | Japan | 252/299.64 |
| 57-7457 | 1/1982 | Japan | 252/299.64 |
| 57-5780 | 1/1982 | Japan | 252/299.63 |
| 57-5781 | 1/1982 | Japan | 252/299.63 |
| 57-5782 | 1/1982 | Japan | 252/299.63 |
| 57-34176 | 2/1982 | Japan | 252/299.63 |
| 57-40229 | 3/1982 | Japan . | |
| 57-109884 | 7/1982 | Japan | 252/299.67 |
| 57-117579 | 7/1982 | Japan | 252/299.67 |
| 57-154158 | 9/1982 | Japan | 252/299.63 |
| 58-29877 | 2/1983 | Japan | 252/299.63 |
| 58-121266 | 7/1983 | Japan | 252/299.63 |
| 2020075 | 11/1979 | United Kingdom . | |
| 2077286 | 12/1981 | United Kingdom | 252/299.63 |
| 82/00654 | 3/1982 | U.S.S.R. | 252/299.5 |

OTHER PUBLICATIONS

Van Meter et al., "Dielectric Properties . . . ", 1975, vol. 16, pp. 315–318, Solid State Communications.
Gray et al., "New Cholesteric Liquid Crystals . . . ", Electronics Letters, Dec. 27, 1973, vol. 9, No. 26, pp. 616–617.

Primary Examiner—Teddy S. Gron
Assistant Examiner—Catherine S. Kilby
Attorney, Agent, or Firm—Blum Kaplan Friedman Silberman & Beran

[57] ABSTRACT

A liquid crystal optical device having improved dielectric relaxation at low frequency is provided. The liquid crystal optical device includes a liquid crystal panel having an optically active nematic liquid crystal composition with a dielectric anisotropy which becomes zero at a crossing frequency ("$f_c$") of 100 KHz or less at atmospheric temperatures and is positive at frequencies lower than $f_c$ ("$f_l$") and negative at frequencies higher than $f_c$ ("$f_h$"). The interior surfaces of the substrates in the liquid crystal panel haven been oriented so that the liquid crystal molecules adjacent to the surfaces are oriented parallel to the directions of orientation. A polarizer is disposed on each outer surface of the panel with the axis of polarization substantially orthogonal to each other. The axis of polarization are disposed at a position of ±45° to the bisector of the two directions of orientation on the interior surfaces of the substrate. This construction results in improved light transmittence and response speed.

9 Claims, 11 Drawing Figures

LIQUID CRYSTAL OPTICAL DEVICE

BACKGROUND OF THE INVENTION

This invention relates to a liquid crystal optical device, and more particularly to a liquid crystal optical device having a high-speed response characteristic which utilizes an optically active nematic liquid crystal composition capable of dielectric relaxation at a low frequency.

The driving method for driving a liquid crystal optical device utilizing a liquid crystal panel including an optically active nematic liquid crystal composition exhibiting dielectric relaxation at low frequencies is described generally in Japanese patent application No. 55-141,085, corresponding to U.S. application Ser. No. 309,521, assigned to the assignee of this application and which application is incorporated herein by reference, and No. 56-7043 and No. 56-7047. Switching of the device is performed by applying signals of two frequencies, a low frequency and a high frequency, to the liquid crystal composition for producing dielectric relaxation. In the conventional techniques, the response speed of the liquid crystal can be increased to a certain extent. However, the response speed is limited in several milliseconds to 10-odd milliseconds. U.S. Pat. No. 3,857,629 is illustrative of such an optical device and increasing response times is described generally in C. S. Bak, K. Ko and M. M. Lakes, Fast Decay In A Twisted Nematic Induced by Frequency Switching, J. of App. Physics, Vol. 46, No. 1, January, 1975. Nonetheless, it would be desirable to improve the driving methods disclosed in these publications, in particular the response speed of the liquid crystal composition.

Accordingly, it is desirable to provide a liquid crystal optical device capable of operating at higher response speeds which will permit such liquid crystal optical devices to find wider application in high-speed printing devices, and the like.

SUMMARY OF THE INVENTION

Generally speaking, a liquid crystal optical device including an improved liquid crystal panel is provided. The liquid crystal panel includes a first transparent plate having at least one common electrode on an interior surface and an opposed spaced apart second transparent plate disposed in confronting relation to the first transparent plate and having a plurality of signal electrodes on the facing surface and a liquid crystal composition sealed between the transparent plates and polarizers on both sides of the substrates. The liquid crystal composition sealed between the substrates includes a nematic liquid crystal material having dielectric anisotropy which becomes zero at a crossing frequency (hereinafter referred to as "$f_c$") of 100 KHz, or less at ordinary temperatures, and an optically active nematic liquid crystal material added therto. An optical device including the liquid crystal panel includes a drive circuit for selectively applying a signal having a frequency higher than $f_c$ (hereinafter referred to as "$f_h$") and a signal having a frequency lower than $f_c$ (hereinafter referred to as "$f_l$") across the opposed common and signal electrodes for opening and closing the liquid crystal optical device.

The interior surface of each of the transparent plates has been oriented so that liquid crystal molecules adjacent thereto are oriented in parallel to each direction of orientation of a transparent plate. The transparent plates are disposed so that the liquid crystal material therebetween is in a twisted configuration of more than 360°. The axis of polarization of the two polarizing plates are arranged substantially orthogonal to each other. The axis of polarization of the polarizers are arranged at a position of ±45° with respect to the bisector of the two directions of orientation of the opposed transparent plates.

A nematic liquid crystal composition producing dielectric relaxation at low frequencies in accordance with the invention includes an optically active nematic liquid crystal composition. Such a composition can be obtained by adding an effective amount of an optically active material, such as 4-(4-hexyloxybenzoyloxy)-benzoic acid-d-2-octylester to a liquid crystal composition.

Accordingly, it is an object of the invention to provide an improved liquid crystal panel.

It is another object of the invention to provide an improved liquid crystal optical device.

It is a further object of the invention to provide an improved liquid crystal optical device including an optically active nematic liquid crystal capable of dielectric relaxation at low frequencies for high-speed responsiveness.

Still another object of the invention is to provide an improved high-speed light valve which may be closed and opened at high speed within small periods of time, does not allow much leakage of light when closed and have a high transmissivity of light when opened.

Still a further object of the invention is to provide a improved liquid crystal composition including a nematic liquid crystal material and an optically active liquid crystal compound.

Yet a further object of the invention is to provide an improved micro-shutter.

Yet another object of the invention is to provide an improved printing device including a liquid crystal optical device in accordance with the invention.

Still other objects and advantages of the invention will in part be obvious and will in part be apparent from the specification.

The invention accordingly comprises the features of construction, combination of elements, arrangement of parts and composition of matter possessing the characteristics, properties and the relation of components which will be exemplified in the construction and composition hereinafter described and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

An illustrative nematic liquid crystal composition exhibiting dielectric relaxation at low frequencies in accordance with the invention is described in the following Table I. An optically active nematic liquid crystal composition can be obtained by adding an effective amount of an optically active material to this liquid crystal composition of Table I. An example of such an optically active material is 4-(4-hexyloxybenzoyloxy)-benzoic acid-d-2-octyl ester.

TABLE 1

| Compound | Compound Rate (Weight Percent) |
|---|---|
| 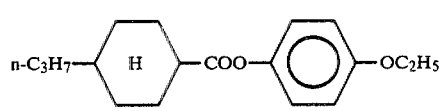 n-C$_3$H$_7$—⟨H⟩—COO—⟨O⟩—OC$_2$H$_5$ | 5 |
| 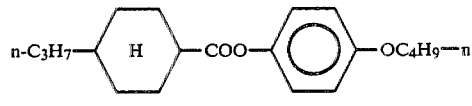 n-C$_3$H$_7$—⟨H⟩—COO—⟨O⟩—OC$_4$H$_9$—n | 15 |
| 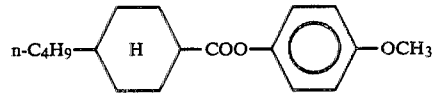 n-C$_4$H$_9$—⟨H⟩—COO—⟨O⟩—OCH$_3$ | 13 |
| 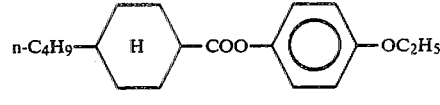 n-C$_4$H$_9$—⟨H⟩—COO—⟨O⟩—OC$_2$H$_5$ | 13 |
| 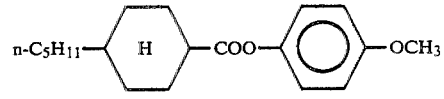 n-C$_5$H$_{11}$—⟨H⟩—COO—⟨O⟩—OCH$_3$ | 14 |
| 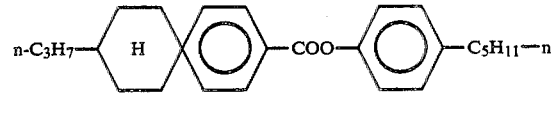 n-C$_3$H$_7$—⟨H⟩⟨O⟩—COO—⟨O⟩—C$_5$H$_{11}$—n | 4 |
| 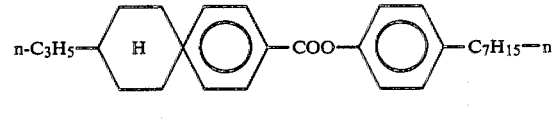 n-C$_3$H$_5$—⟨H⟩⟨O⟩—COO—⟨O⟩—C$_7$H$_{15}$—n | 10 |
| 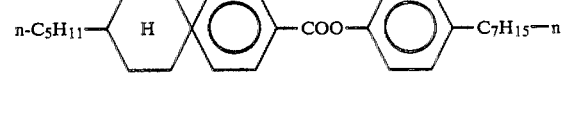 n-C$_5$H$_{11}$—⟨H⟩⟨O⟩—COO—⟨O⟩—C$_7$H$_{15}$—n | 7 |

TABLE 1-continued

| Compound | Compound Rate (Weight Percent) |
|---|---|
| n-C₄H₉—⬡—COO—⬡(CN)(CN)—OOC—⬡—C₄H₉-n | 3 |
| n-C₅H₁₁—⬡—COO—⬡(CN)(CN)—OOC—⬡—C₅H₁₁-n | 2 |
| n-C₆H₁₃—⬡—COO—⬡(CN)(CN)—OOC—⬡—C₆H₁₃-n | 1 |
| n-C₇H₁₅—⬡—COO—⬡(CN)(CN)—OOC—⬡—C₇H₁₅-n | 1 |
| n-C₅H₁₁O—⬡—COO—⬡—COO—⬡(Cl)—CN | 2 |
| n-C₆H₁₃O—⬡—COO—⬡—COO—⬡(Cl)—CN | 7 |
| n-C₈H₁₇O—⬡—COO—⬡—COO—⬡(Cl)—CN | 3 |

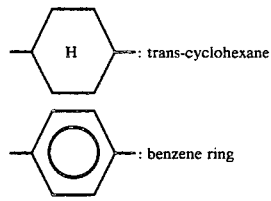

An optically active liquid crystal composition may be formed by addition of about 2.2 weight percent of the optically active material. Such an optically active nematic liquid crystal composition will be referred to hereinafter as Liquid Crystal-I. The dielectric constant of a liquid crystal is generally different in the direction along or parallel to the molecular axis of the liquid crystal molecule and the direction perpendicular to the molecular axis. The dielectric constant in the direction parallel to the molecular axis is represented as $\epsilon_{11}$ and the dielectric constant in the direction perpendicular thereto is designated $\epsilon_1$. In addition, the difference between $\epsilon_{11}$ and $\epsilon_1$, specifically $\epsilon_{11} - \epsilon_1$ is defined as the dielectric anisotropy, $\Delta\epsilon$. The relationships designated $\Delta\epsilon > 0$ and $\Delta\epsilon < 0$, respectively designate that the dielectric anisotropy is either positive or negative.

Figure 1:
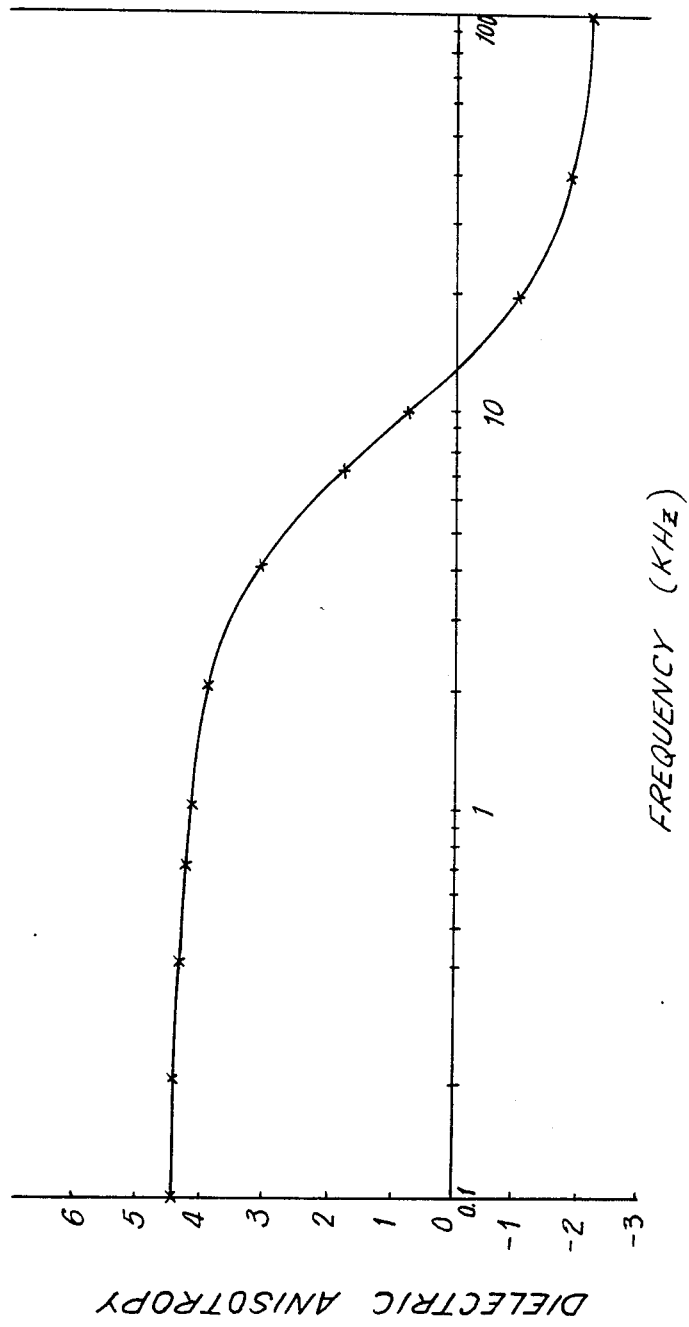
FIG. 1 is a graph illustrating a general frequency-dielectric anisotropy characteristic of a liquid crystal composition wherein dielectric relaxation can occur at low frequencies and dielectric anisotropy is reversible.

In liquid crystal compositions utilized in this invention, changes in dielectric anisotropy depend upon the frequency of the signal applied across the composition. The relationship, $\Delta\epsilon > 0$ (positive) is exhibited at low frequencies ($f_l$), lower than the crossing frequency $f_c$, while the relationship $\Delta\epsilon < 0$ is obtained at higher frequencies ($f_h$) than $f_c$. FIG. 1 illustrates the Frequency-Dielectric Anisotropy characteristics of Liquid Crystal-I at temperatures of about 30° C.

As noted above, frequencies of $f_1$ lower than the crossing frequency $f_c$ are referred to as "$f_1$" and frequencies higher than $f_c$ are referred to as "$f_h$". The designation $\Delta\epsilon_L$ and $\Delta\epsilon_H$ each represent the dielectric anisotropies corresponding to applied signals $f_1$ and $f_h$, respectively. When applying a low frequency signal $f_1$ to the opposed electrodes in a liquid crystal panel, liquid crystal molecules are arranged in parallel with the direction of the electric field. When applying a high frequency signal $f_h$, the liquid crystal molecules are arranged substantially perpendicular to the direction of the electric field.

Figure 2:
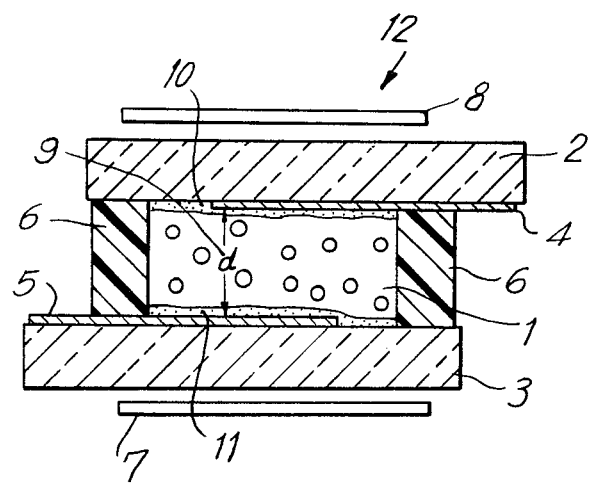
FIG. 2 is a cross-sectional view illustrating the structure of a liquid crystal panel in accordance with the invention.

FIG. 2 is a schematic illustration of a cross-sectional view of a liquid crystal panel shown generally as 12 which may be utilized in a liquid crystal optical device in accordance with the invention. Liquid crystal panel 12 includes a liquid crystal layer 1 encapsulated between a first substrate 2 and an opposed second substrate 3. First substrate 2 has at least one electrode 4 disposed on the interior surface thereof and second substrate 3 similarly has at least one electrode 5 disposed on the interior surface thereof. An interval of thickness "d" indicated by reference numeral 9 is maintained by a seal 6 between substrates 2 and 3. Seal 6 also serves to seal liquid crystal layer 1 in the space between substrates 2 and 3. Hereinafter, "d" is referred to as the "thickness of the liquid crystal layer."

The interior surfaces of substrates 2 and 3 are treated so as to impart a direction orientation on the interior surface of each plate. For example, an epoxy-silane resin, a polyimide resin, or the like may be used as an orientation agent. In the illustration of FIG. 2 a layer of orientation agent 10 and 11 have been applied to substrates 2 and 3, respectively. Orientation layers 10 and 11 are then rubbed with an absorbent cotton for imparting a direction of orientation to the liquid crystal molecules adjacent to substrates 2 and 3. It is understood that the invention is not to be limited to depositing a resin for orientation as a direction of orientation may be imparted by rubbing the surface of the substrate without using an orientation agent. Another alternative method of imparting orientation is to deposit silicone oxide onto the substrate under oblique incidence so that the liquid crystal molecules adjacent to the substrate will orient substantially parallel to the direction of orientation along the surface of the substrate. A pair of polarizing films 8 and 7 are disposed on the outer surfaces of substrates 2 and 3, respectively.

Liquid Crystal-1 is an optically active nematic liquid crystal composition with a molecular configuration in the form of a helix or a twisted configuration. The pitch of the twist in Liquid Crystal-1 is almost 4 $\mu$m at atmospheric temperatures. In this specification, the twist pitch is defined as a period of one rotation of twist of the liquid crystal molecules. Additionally, the direction of twist of Liquid Crystal-1 is clockwise from lower substrate 3 to upper substrate 2. This corresponds with the fact that the optically active material utilized in this composition in accordance with the invention, namely 4-4(4-hexyloxybenzoyloxy)-benzoic acid-d-2-octylester has a left-hand twisted configuration. If an optically active material having a right-hand twisted configuration is utilized in place of the left-hand twist, the twist direction of Liquid Crystal-1 would be reversed. The following description is based on utilizing Liquid Crystal-1 with a left-hand twisted configuration; however, it is within the scope of the invention to utilize a liquid crystal composition wherein the optically active material is a molecule having either a right-hand or left-hand twisted configuration.

Figure 3:
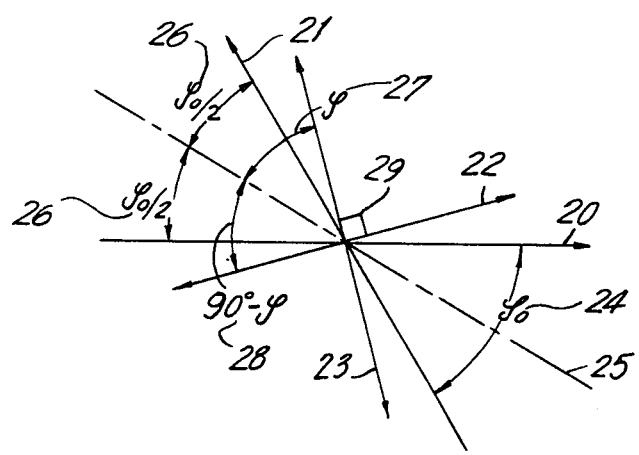
FIG. 3 illustrates the directions of orientation on the substrate surfaces and the axis of polarization of the polarizing films in a liquid crystal panel of the type illustrated in FIG. 2.

FIG. 3 illustrates the direction of orientation of the interior surfaces of substrates 2 and 3 and the relationship with the direction of the axes of polarization of polarizers 7 and 8. Arrows 20 and 21 represent the directions of orientation (the rubbing direction) along the interior surface of lower substrate 3 and of upper substrate 2, respectively. FIG. 3 is a plan view of liquid crystal panel 12 from the upper direction or along a line of sight through polarizer 8 to polarizer 7. An arrow 22 represents the direction of the axis of polarization of lower polarizer 7. Arrow 23 represents the direction of the axis of polarization of upper polarizer 8. However, with respect to a light passing through the two polarizing films, if panel 12 is turned upside down, the difference is within measurement errors, so that there is little difference between both directions of sight in the following description.

A bisector 25 divides the angle formed between directions of surface orientation 20 and 21. The same result is obtained with respect to the other bisector of the directions of orientation; namely, a line perpendicular to bisector 25. Accordingly, the following description will be limited only to the angle formed by bisector 25 in directions of orientation 20 and 21. The angle between two directions of orientation 20 and 21 is an angle $\phi_0$ identified by numeral 24. Bisector 25 bisects angle $\phi_0$. The bisected angle $\phi_0$ is shown by an angle $\phi_0/2$ identified as 26. The angle formed between bisector 25 and the axis of polarization 23 of upper polarizer 8 is shown by an angle $\phi$. As described above, axis of polarization 23 in upper polarizer 8 and axis of polarization 22 of lower polarizer 7 are disposed at right angles to each other in order to minimize light transmittance in the light shielding state, or when the light shutter is closed. Thus, the angle formed between the axis of polarization 22 of lower polarizer 7 and bisector 25 is $90° - \phi$.

In a liquid crystal panel wherein directions of surface orientation 20 and 21 are arranged as illustrated in FIG. 3, the thickness d of liquid crystal layer 1 of a Liquid Crystal-1 is maintained about 5 $\mu$m. The liquid crystal molecules within liquid crystal layer 1 are arranged in twisted configurations of $350° + \phi_0$. The driving signals applied across liquid crystal layer 1 in accordance with the invention will now be described.

Figure 4:
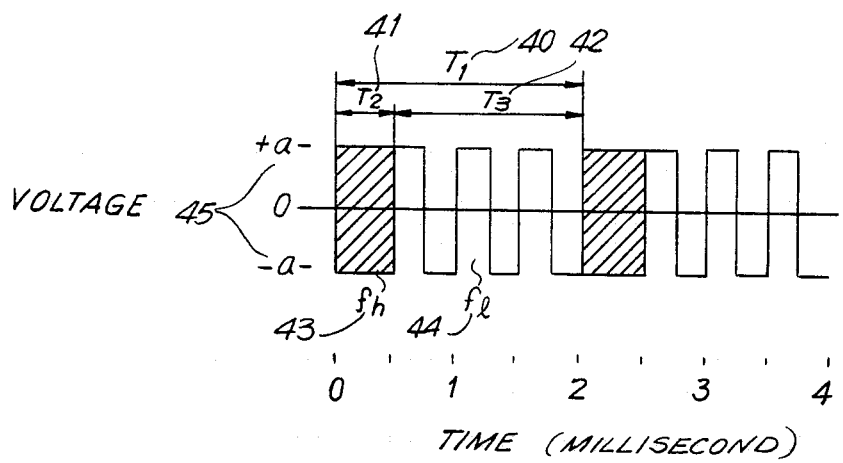
FIG. 4 is illustrative of a driving signal applied to the liquid crystal panel of FIG. 2.

FIG. 4 illustrates the driving signals applied to the liquid crystal panel in accordance with the invention. The signal illustrated in this figure is repeated in a repetition period $T_1$ identified by reference numeral 40. Time $T_2$ identified by reference numeral 41 is the time for opening the liquid crystal shutter and time $T_3$ identified by reference numeral 42 is the time for closing the liquid crystal shutter. A signal of high frequency $f_h$ shown by reference numeral 43 is applied during the period of time $T_2$ and a signal of low frequency $f_1$ shown by reference numeral 44 is applied during a period of time $T_3$. The signals are applied to the opposed electrodes disposed on the inner surfaces of the substrates. Voltage $+a$ and $-a$ represents a voltage V of $\pm a$ applied to the electrodes and is shown by reference numeral 45. Light is transmitted through the liquid crystal panel by applying the high frequency signal $f_h$ to the electrodes and light is shut off by the liquid crystal panel by applying the low frequency signal $f_1$ to the electrodes, thereby closing the liquid crystal shutter panel.

Figure 5:
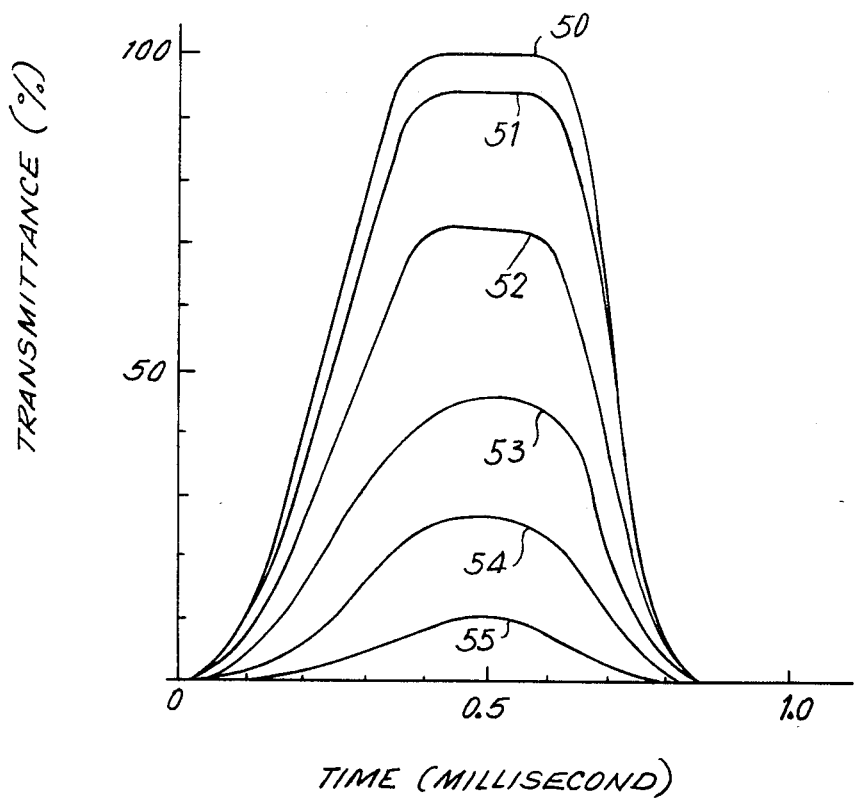
FIG. 5 is a graph showing the light transmittance characteristic of a liquid crystal optical device including the liquid crystal panel of the type illustrated in FIG. 2 at varying angles between the axes of polarization and the bisector of the angles of direction of orientation of the interior surfaces of the substrates.
Figure 6:
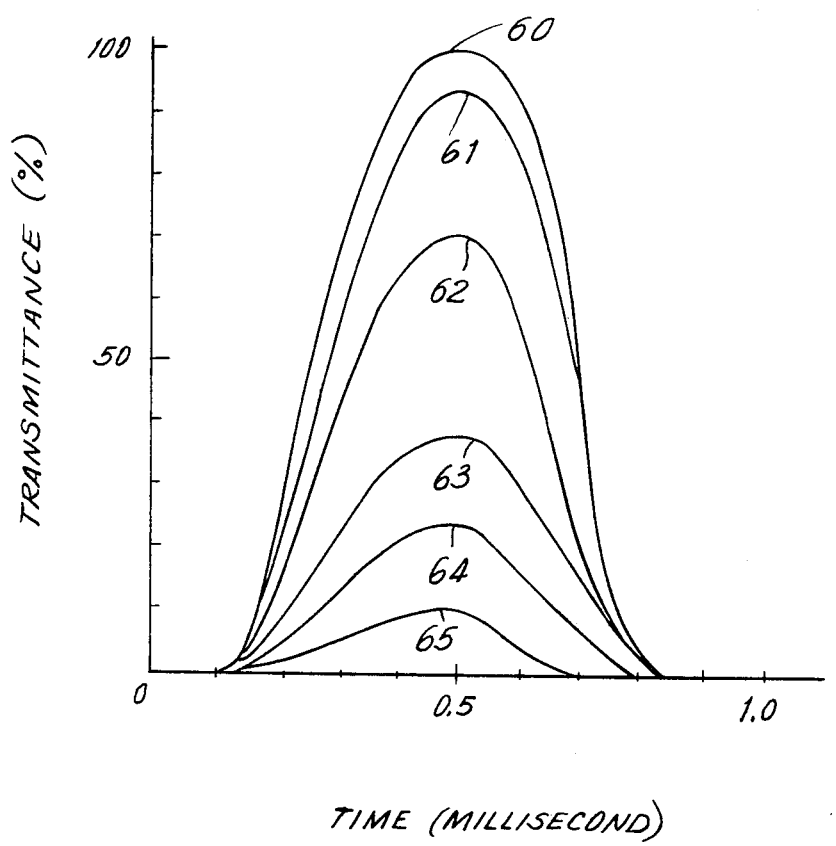
FIG. 6 is a graph showing the light transmittances characteristic of a liquid crystal optical device including the liquid crystal panel of the type illustrated in FIG. 2 at varying angles between the axes of polarization and the bisector of the angles of direction of orientation of the interior surfaces of the substrates.

FIGS. 5 and 6 illustrate results obtained by measuring the light transmittance through the liquid crystal panel for various angles $\phi$ between the axis of polarization of the polarizer 8 and the bisector of the angle formed by the two directions of orientation of the substrates. A light transmittance of 100% referred to herein means the light transmittance when using only two polarizing films and disposing their axis of polarization in parallel. FIG. 5 illustrates the results obtained when angle $\phi_0$ between the two directions of surface orientation is 50°. In FIG. 6, the results were obtained wherein angle $\phi_0$ is maintained at 110°. In each case the experimental conditions were as follows.

A Liquid Crystal-1 is utilized and it is encapsulated between substrates in a liquid crystal layer having a thickness d of between 5.1 and 5.3 μm. Liquid crystal driving signals as illustrated in FIG. 4 are applied to opposed electrodes. In each case, $T_1=2$ m seconds, $T_2=0.5$ m seconds, $f_h=130$ KHz, $f_1=2$ KHz and the voltage is a $=28$ V. The temperature of the liquid crystal panel is 40° C. The same conditions are maintained for obtaining the results illustrated in both FIGS. 5 and 6. However, as noted above, angle $\phi_0$ is 50° in FIG. 5 and angle $\phi_0$ is 110° in FIG. 5. Thus, in the experiment reported in FIG. 5, the liquid crystal has a twisted configuration of 410° and in FIG. 6 the liquid crystal is twisted 470°.

Curves 50-55 in FIG. 5 and curves 60-65 in FIG. 6 are obtained for various values of angle $\phi$. Angle $\phi$ is 45° in curves 50 and 60, 40° in curves 51 and 61, 30° in curves 52 and 62, 20° in curves 53 and 63, 10° in curves 54 and 64 and 0° in curves 55 and 65. There is little difference between light transmittance when angle $\phi$ is 50°, 60°, 70°, 80° and 90° and wherein angle $\phi$ is 40°, 30°, 20°, 10° and 0°, respectively. Thus, it is clear from the results reported in FIGS. 5 and 6 that the light transmittance reaches the highest value by providing an angle $\phi$ of 45°. While FIGS. 5 and 6 illustrate the light transmittance obtained wherein angle $\phi$ between the two directions of orientation is 50° and 110°, the same result is obtained with respect to all angles of 100 0 when the measurement was recorded each 10°.

The following, which are the essentials in accordance with the invention, are demonstrated by the above described results. The light transmittance of the liquid crystal panel reaches a maximum by adjusting the direction of orientation on the interior surfaces of the two substrates in order to orient the liquid crystal molecules adjacent to the substrates in parallel with the directions of orientation, and arranging the axes of polarization of the two polarizing films in a direction of ±45° with respect to the bisector of the two directions of surface orientation. As descirbed above, it is a primary object of the invention to provide a liquid crystal optical device which has a high-speed response characteristic and has high light transmittance. By regulating the directions of orientation on the interior surfaces of the substrates and the axis of polarization of the two polarizing films of the liquid crystal panel, a liquid crystal optical device utilizing a nematic liquid crystal composition which is optically active and exhibits dielectric relaxation at low frequency may be attained.

The following examples in accordance with the invention are described in order to illustrate the invention. These examples are not presented in a limiting sense.

EXAMPLE 1

Figure 7:
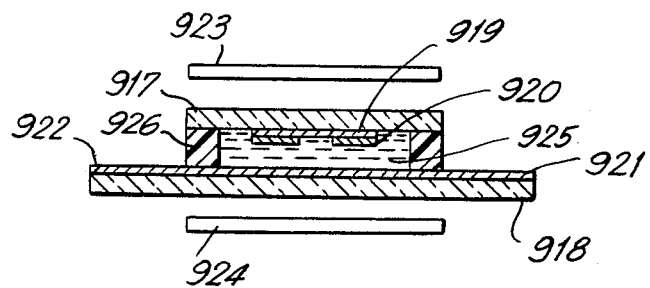
FIG. 7 is a cross-sectional view of a liquid crystal panel in accordance with the invention adapted as a micro-shutter for a light printer in accordance with the invention.
Figure 8:
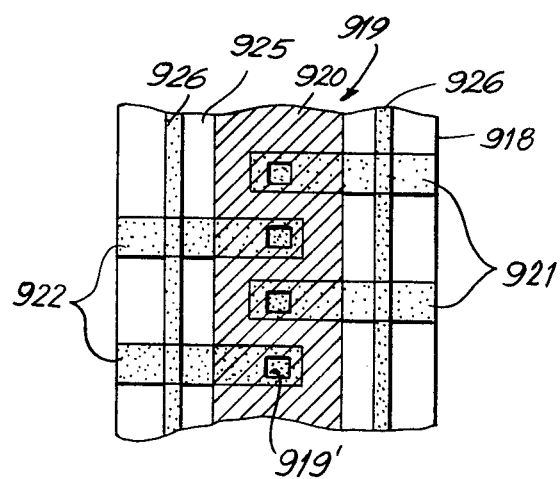
FIG. 8 is a plan-view of the micro-shutters illustrated in FIG. 7.

In this Example, a liquid crystal optical device in accordance with the invention is utilized as a micro-shutter for light writing. FIGS. 7 and 8 illustrate the construction of a liquid crystal panel 900. Liquid crystal panel 900 is formed of an upper glass substrate 917 with common signal electrodes 919 and 920 disposed on the interior surface thereof. A second, lower, glass substrate 918 with signal electrodes 921 and 922 disposed on the interior surface thereof is arranged opposite to first substrate 917 with spacers 926 for maintaining the substrates apart and to encapsulate a liquid crystal composition 925 therebetween. A pair of polarizing films 923 and 924 are positioned on the upper and lower sides of substrates 917 and 918, respectively. The common signal electrode disposed on upper glass substrate 917 includes a transparent electrode 919 and a metal electrode 920 which is optically opaque. The signal electrodes 921 and 922 disposed on lower substrate 918 are optically transparent.

Light is modulated in the micro-shutter section 919' formed by the exposed transparent segments of the common electrode 919 and the transparent signal electrodes 921 and 922. In this example, a micro-shutter section was formed of 2000 micro-shutters each having a pitch interval of 100 μm for a total length of 20 cm. The angle between the the two directions of surface orientation, corresponding to directions 20 and 21 in FIG. 3, was 50° and the axes of polarization of polarizing films 923 and 924 were arranged in a position of ±45° with respect to the bisector (25 in FIG. 3) of the two directions of orientation of the interior surfaces of substrates 917 and 918.

With respect to the method for driving the liquid crystal micro-shutters, an integrated circuit driver was made and placed on the panel. This driver had the capability of switching the micro-shutters in response to multiplexed picture element data. As each integrated circuit driver has 50 outputs, 20 integrated circuit drivers are provided on each side of the panel, or 40 in total, for the 2000 micro-shutters.

Figure 9:
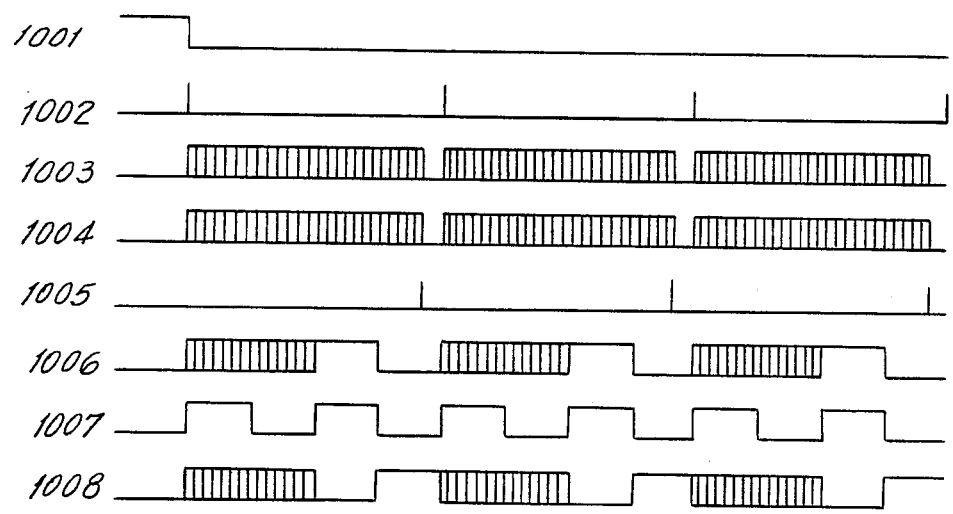
FIG. 9 is a timing chart illustrating the types of signal waveforms which are required for driving the liquid crystal optical devices in accordance with the invention.
Figure 10:
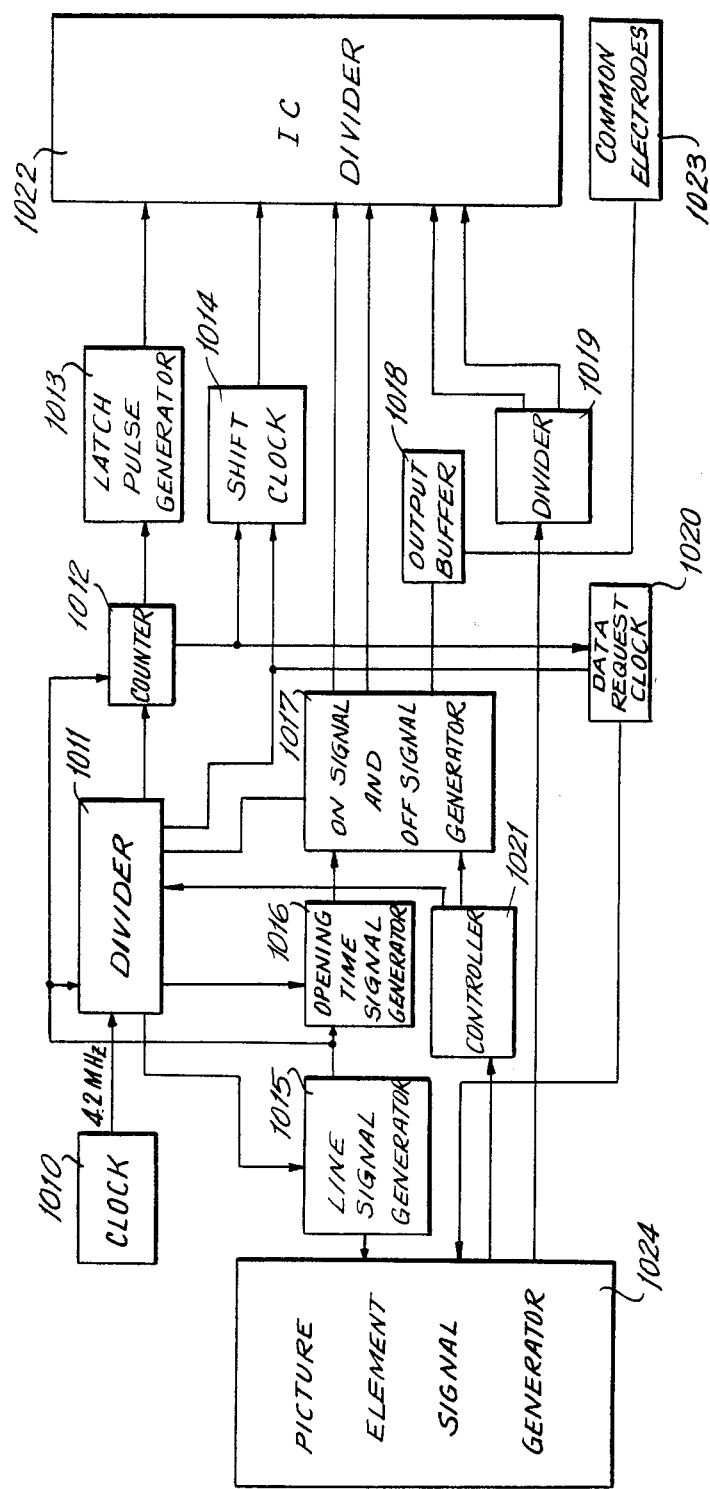
FIG. 10 is a block circuit diagram of the driving circuit for generating the signals of FIG. 9 for driving a liquid crystal optical device in accordance with the invention.

FIG. 9 is a timing chart of the various types of signal wave forms which are required for driving the micro-shutters. FIG. 10 is block circuit diagram for driving the micro-shutters. Signal 1001 in FIG. 9 is a reset signal for starting the operation. A line start signal 1002 indicates the start of one line of data. A signal 1003 requesting data of one line which is formed of 2000 clock pulses per one repetition frequency is synchronized with line start signal 1002. Data are transferred by being synchronized with the above clock pulses. A shift clock signal 1004 transfers data in a shift register of the integrated circuit driver. Latch pulses 1005 are for latching data immediately after finishing the data transfer.

Driving wave forms 1006, 1007 and 1008 are the wave forms applied to the liquid crystal material. The signal applied to the common electrode is common electrode signal 1008. The liquid crystal micro-shutter is opened when an ON signal 1006 is applied to the signal electrode and the micro-shutter closes when a OFF signal 1007 is applied to the signal electrode. ON signal 1006 and common electrode signal 1008 are formed of a combination of high frequency $f_h$ with low frequency $f_1$ components, with the phase inverted with respect to each other. OFF signal 1007 is low frequency $f_1$ which is in phase with the low frequency $f_1$ component in ON signal 1006. The high frequency $f_h$ component of ON signal 1006 is referred to as "open time".

Referring specifically to FIG. 10, the circuit for driving the system will be described. A divider 1011 divides a 4.2 MHz standard clock pulse generated by a standard pulse clock 1010. A line start signal having a period of 2 msec. is generated in line start signal generator 1015 and all blocks are synchronized by this line start signal. A signal requesting data for one line is generated by data request signal generator 1020 by counting 2000 pulses in a counter 1012. Data request signal generated by generator 1020 and line start signal generated by generator 1015 are applied to multiplex picture element signal generator 1024 which is maintained external to the shutter panel. The data generated by picture element generator 1024 which is synchronized with the requesting signal, are divided in divider 1019 for transfer to an inter-digital driver IC 1022.

The opening time of the micro-shutter is determined in opening time signal generator 1016 and an ON signal, an OFF signal and a common electrode signal are generated in electrode signals generator 1017. Latch pulses and shift clock pulses are generated in lacth pulse generator 1013 and shift clock pulse generator 1014, respectively and applied to IC driver 1022 along with ON signal and OFF signal data. Common electrode signal is amplified to 30 V in an output buffer 1018 and applied to common electrodes 1023. A controller 1021 receives reset signals for external picture element generator 1024 for controlling a signal generator 1017 for opening and closing the micro-shutters.

Figure 11:
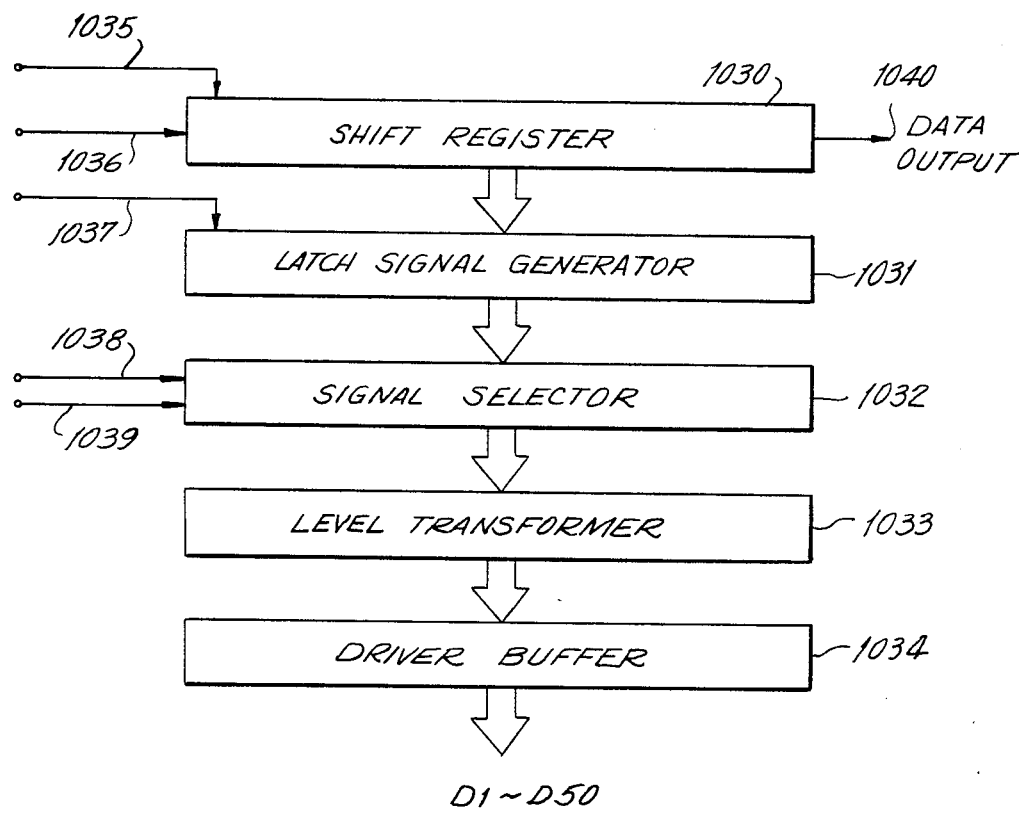
FIG. 11 is a block diagram of an integrated circuit for use in a liquid crystal optical device in accordance with the invention.

FIG. 11 is a block diagram of the internal circuit of one of the 40 integrated circuit drivers 1022 forming part of the IC driver circuit of FIG. 10. Data is supplied via a line 1036 from IC circuit of FIG. 10 and are transferred to another IC driver via a line 1040 after being synchronized with shift clock pulses 1004 applied by a line 1035 in a 50 bit shift register 1030. 20 shift registers of the integrated circuit for one side of the panel are connected in cascade and the data from the data output line 1040 is transferred to the shift register of the next IC driver. When transferring 1000 bits of data on one side, namely 2000 bits of data on both sides of the panel are transferred in this way. A 50 bit latch of generator 1031 latches the data which is synchronized with latch pulse 1005 received on line 1037. ON signal 1006 received on line 1038 and OFF signal 1007 received on line 1039 are switched in correspondence with the data which is latched in switch 1032 and a logic level transformer 1033 raises the driving voltage to 30 V and the resulting signal is applied from a driving buffer 1034 to the signal electrodes on the lower surface of the liquid crystal panel.

In accordance with this example, a switching speed of 2 m sec./line for the light shutter can be obtained. This is possible due to the micro-shutters being driven in accordance with this driving method.

EXAMPLE 2

The linearly arranged micro-shutters described in Example 1 are maintained at 40° C. and periods $T_1$ and $T_2$ are set to 2 m seconds and 0.5 m seconds, respectively. A fluorescent lamp having a brightness of 150,000 cd/m$^2$ and having a luminous peak at a wavelength of 540 mm is placed behind the micro-shutter line. Light passing through the micro-shutters is applied to a selenium-tellurium photo-sensitive material and an image can be formed according to printing signals which are developed with toner and magnetic roll developer. The photo-sensitive material moves at a speed of 5 cm/second. In this way, a high-speed light writing printer can be obtained.

By providing liquid crystal micro-shutters in accordance with the invention, a liquid crystal optical device having high-speed response characteristics can be realized. When the micro-shutters are utilized in light writing devices, the useful applications of the invention are readily apparent. Additionally, unique advantages are obtained in accordance with the invention, such as relatively low costs, large area capability at low power consumption due to use of a liquid crystal optical device as described.

It will thus be seen that the objects set forth above, among those made apparent from the preceding description, are efficiently attained and, since certain changes may be made in the described compositions and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A liquid crystal optical device comprising a liquid crystal display panel including two opposed transparent substrates each having at least one electrode deposited on the interior surface thereof, a layer of a liquid crystal composition, the liquid crystal composition being an optically active nematic liquid crystal composition having a dielectric anisotropy which, at ordinary temperatures, becomes zero at a crossing frequency ("$f_c$") of 100 KHz or less, the dielectric anisotropy being positive at frequencies lower than $f_c$ ("$f_l$") and negative at frequencies higher than $f_c$ ("$f_h$"), the interior surface of each substrate having been treated so that the liquid crystal molecules adjacent to the surfaces of the substrates are oriented in parallel with the respective direction of orientation, the substrates being arranged so that the molecules of the liquid crystal are in a twisted configuration of more than 360°, a pair of polarizing plates disposed on the exterior surfaces of the substrates, the axes of polarization of the two polarizing plates being substantially orthogonal to each other and the axes arranged at a position of ±45° with respect to the bisector of the angle formed by the two directions of orientation provided on the interior surfaces of the substrates.

2. The liquid crystal optical device of claim 1, wherein the liquid crystal composition is a composition including an optically inactive liquid crystal composition and an effective amount of an optically active liquid crystal compound added thereto.

3. The liquid crystal optical device of claim 2, wherein the optically active compound is present in an amount of about 3 weight percent of the composition.

4. The liquid crystal optical device of claim 1, wherein the angle between the axes of polarization of the polarizers is between about 80° and 100°.

5. The liquid crystal optical device of claim 1, wherein the angle between the axes of polarization of the polarizers is 90°.

6. The liquid crystal optical device of claim 4, wherein the liquid crystal composition is a composition including an effective amount of optically inactive liquid crystal composition and an optically active liquid crystal compound added thereto.

7. The liquid crystal optical device of claim 4, 5 or 6, wherein the optically active compound is present in an amount of about 3 weight percent of the composition.

8. The liquid crystal optical device of claim 1 and further comprising:

means coupled to the electrodes on the interior surfaces of the substrates for applying at least one driving signal thereto, the driving signal comprising a high-frequency component $f_h$ for opening the liquid crystal shutter and a low-frequency component $f_l$ for closing the liquid crystal shutter during a repetition period $T_1$, whereby maximum light transmittance by the liquid crystal shutter is obtained during the period $T_1$.

9. The liquid crystal optical device of claim 6 and further comprising:

means coupled to the electrodes on the interior surfaces of the substrates for applying at least one driving signal thereto, the driving signal comprising a high-frequency component $f_h$ for opening the liquid crystal shutter and a low-frequency component $f_l$ for closing the liquid crystal shutter during a repetition period $T_1$, whereby maximum light transmittance by the liquid crystal shutter is obtained during the period $T_1$.

* * * * *